United States Patent [19]

Bahns et al.

[11] Patent Number: 5,051,582

[45] Date of Patent: Sep. 24, 1991

[54] METHOD FOR THE PRODUCTION OF SIZE, STRUCTURE AND COMPOSITION OF SPECIFIC-CLUSTER IONS

[75] Inventors: John T. Bahns, DeWitt; William C. Stwalley, Iowa City, both of Iowa

[73] Assignee: The United States of America as represented by the Secretary of the Air Force, Washington, D.C.

[21] Appl. No.: 407,388

[22] Filed: Sep. 6, 1989

[51] Int. Cl.⁵ .......................................... B01D 59/44
[52] U.S. Cl. ........................... 250/283; 250/423 R; 376/106; 376/107; 376/127; 376/120
[58] Field of Search .................. 250/423 R, 424, 283, 250/281, 282; 376/106, 107, 108, 109, 110, 111, 114, 115, 116, 117, 120, 127, 151; 149/1

[56] References Cited

U.S. PATENT DOCUMENTS

| | | | |
|---|---|---|---|
| 3,278,351 | 10/1966 | Null et al. | 149/15 |
| 4,462,954 | 7/1984 | Weinert | 376/208 |
| 4,540,884 | 9/1985 | Stafford et al. | 250/282 |
| 4,737,637 | 4/1988 | Krauer | 250/281 |
| 4,755,344 | 7/1988 | Friedman et al. | 250/423 R |

Primary Examiner—Jack I. Berman
Attorney, Agent, or Firm—Stanton E. Collier; Donald J. Singer

[57] ABSTRACT

The method of producing specific cluster ions utilizing an ionization source to produce ions which are then sorted or resolved according to velocity and mass. The selected ions are passed through a growth chamber containing a gaseous vapor of a specified element and are coated by the vapor to provide coated cluster ions. The coated cluster ions are mass selected and held in an ion trap.

8 Claims, 1 Drawing Sheet

METHOD FOR THE PRODUCTION OF SIZE, STRUCTURE AND COMPOSITION OF SPECIFIC-CLUSTER IONS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to ion generation, and in particular to the generation of binary, heterogeneous, coated, cluster ions.

The state of the art of ion generation is well represented and alleviated to some degree by the prior art apparatus and approaches which are contained in the following U.S. Patents:

U.S. Pat. No. 3,278,351 issued to Null et al on Oct. 11, 1966;

U.S. Pat. No. 4,462,954 issued to Weinert on July 31, 1984; and

U.S. Pat. No. 4,540,884 issued to Stafford et al on Sept. 10, 1985.

The Null et al patent describes the apparatus and method for the production and the storage of high concentration free radicals, which are represented illustratively by solid state atomic hydrogen laminated with molecular hydrogen for use as a propellant in projecting satellites into orbit, as a high explosive.

The Weinert patent is directed to an energy cell. A self pulsating nuclear reactor plant is comprised of a reactor cylinder concealing a pair of mobile nuclear mass blocks chosen for pendent radially motion inside a radial cylinder.

The Stafford et al patent describes a method of mass analyzing a sample of use of a quadrupole ion trap type mass spectrometer. In a quadrupole ion store or ion trap type mass spectometer, significantly improved mass selection is achieved by simultaneously trapping ions within the mass range of interest and then scanning the applied RF and DC voltages or the frequency $\omega$ to sequentially render unstable trapped ions of consecutive specific masses. These are passed out through apertures in an end cap to a high gain electron multiplier to provide a signal indicative of the ion mass.

Advances in the field of ion trap design have progressed rapidly and in response to the requirements of the state of the art. In order for the process to be utilized to its fullest potential, two developments need to take place: First, the development of large volume traps (or arrays of traps) for the storage of large quantities of (potentially large) cluster ions. Current traps routinely confine ions in a small volume of space ($<1$ cm$^3$) and with mass-to-charge-ratios of only a few hundred AMU/q (atomic mass units per unit charge). Extension to volumes approaching 1 M$^3$ with trapping potentials for ions with mass-to-charge-ratios of a few thousand AMU/q are desirable. Ion trap technology is a well developed field (in existance for more than 30 years) such that only minor modification of the existing theory (Mathieu equation) would be necessary. An alternative to the development of large volume traps is the development of array ion traps that have the capability of efficiently transferring less strongly bound ions to other discrete traps. The current state of the art is that double traps (with transport capability) are in the early stages of development. Ion trap arrays are simply an extention of the double trap idea, but with the intent of having improved transfer capability and significant (volume) storage capacity. Second, the further development of large hybrid ion trap structures. These constitute traps for ions that utilize static as well as dynamic electric and magnetic fields simultaneously or in some combination in order to achieve the desired hybrid trapping potential surfaces. A simple example of a hybrid ion trap would be a Penning trap that can instantaneously be turned into a RF (or Paul) trap and back again, if need be, without requiring a change in any of its physical dimensions.

While the above-cited references are instructive, a need remains to provide a method of producing heterogeneous coated cluster ions. The present invention is intended to satisfy that need.

SUMMARY OF THE INVENTION

The present invention utilizes ions which are generated in a conventional source and are velocity and mass resolved by the velocity selector and quadrupole mass filter for the production of cluster ions. The resulting ion beam is then bent by magnetic field and applied through a drift tube which contains a gaseous neutral vapor of an element that is used in the growth cycle to produce coated cluster ions. The coated cluster ions leave the drift tube and are again mass selected by a quadrupole mass filter to produce a beam of size, structure, and composition specific coated isotopic cluster ions that are trapped in the ion trap.

It is one object of the present invention, therefore, to provide an improved method for producing heterogeneous, coated cluster ions.

It is another object of the invention to provide an improved method for producing heterogeneous, coated cluster ions which are size, structure and composition specific.

It is yet another object of the invention to provide an improved method for producing heterogeneous, coated cluster ions which are stored in the containerless environment of a hybrid ion-trap structure.

It is still another object of the invention to provide an improved method for producing heterogeneous, coated cluster ions which are first velocity and mass selected, and then their chemical and structural identity is modified by a generalized growth cycle in a gas vapor reaction.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
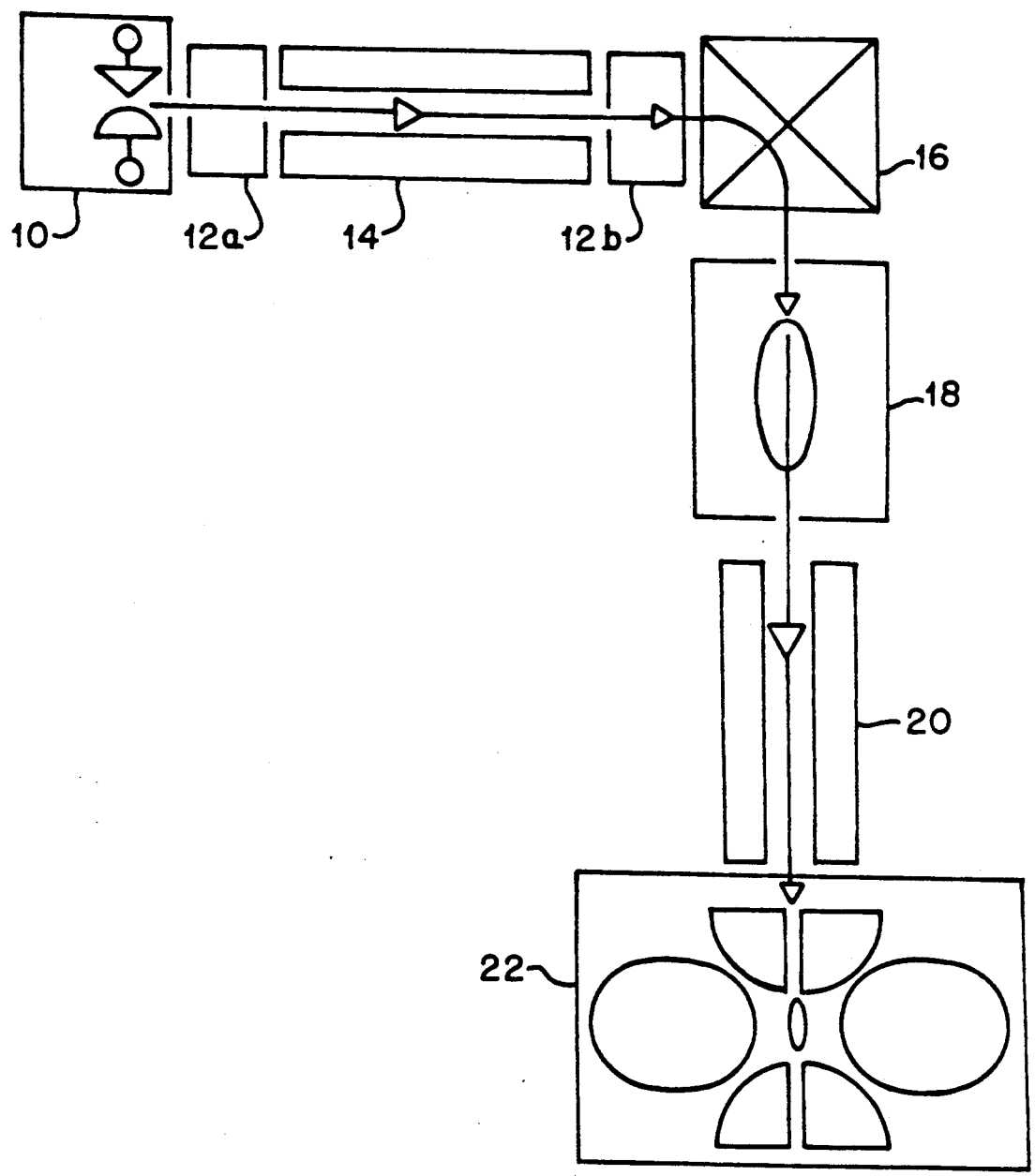
FIG. 1 is a schematic illustration of the apparatus and method for producing binary, heterogeneous, coated cluster ions according to the present invention.

Turning now to FIG. 1, there is shown a schematic illustration of the process by which size, structure, and composition specific-cluster ions (SSCS-CI) of any elemental composition or structure may be produced and stored in the containerless environment of hybrid ion-trap structure. The process proceeds as follows. First, cluster ions are grown via an appropriate commerciallyavailable conventional means 10 such as corona discharge expansion. A velocity selector unit 12a allows ions of a preselected velocity to pass through to the quadrupole mass filter unit 14. The ions are mass resolved in the quadrupole mass filter unit 14 and are directed through velocity selector unit 12b which selects or passes the ions that have a preselected velocity. The resulting beam is then bent by the magnetic field unit 16 and enters a drift tube unit 18 which contains a gaseous neutral vapor of element U (where the growth cycle occurs. Next, their chemical and structural identity is modified by subjecting them to generalized growth cycles consisting of gas phase ion-atom, ion-molecule, or ion-ion association reactions. The U-coated hydrogen cluster ions then leave the drift tube unit 18 and are again mass selected by a quadrupole mass filter unit 20, to produce a beam of size, structure, and composition specific U-coated isotopic cluster ions that are trapped in the ion trap unit 22. This results in the production of coated cluster ions which are subsequently sorted by mass-to-charge ratio and stored. The whole process (following the initial step) takes place within the containerless environment of electric and magnetic ion trap structures. The product ions (or neutrals) of these generalized growth cycles will posses new and fascinating coated cluster ion structures and properties. The overall synthetic process proceeds in a nearly continuous manner without significant loss of cluster ions in any phase since the trapping fields that confine them, under the prescribed conditions, have very large trap depths, and virtually unlimited storage times (and volumes) for resonant (or nearly resonant) cluster ions.

A specific example of the above process is applied to the problem of energy production utilizing fusion of light elements (such as hydrogen isotopes). In this case, one proceeds by producing size, structure, and composition specific isotopic hydrogen cluster ions and subsequently causing them to undergo one or more generalized growth cycles that apply (or grow) coatings (or laminants) of one or more chemical elements to them (for this example elements such as Uranium (U), Plutonium (Pu), etc. might be used). The growth cycles might be accomplished by passing preaccelerated isotopic hydrogen cluster ions (Hydrogen, Deuterium, or Tritium) through a drift tube (or heat pipe) containing the metal vapor, or exposing the trapped hydrogen cluster ions to more volatile compounds such as $UF_6$.

The resulting coated (at all occurrences) cluster ions could then be used as targets (or projectiles) for high energy laser or particle beams (or cluster ion accelerators). These two possibilities will be discussed separately: In the first case, the coated cluster ions are levitated in well defined orbits by the use of appropriate electric and magnetic fields and then subjected to very high temperatures and pressures while being ablatively imploded with intense bursts of laser photons or high velocity neutral particles. The current approach to fusion uses these methods to burn hydrogen fuel, but is different in that much larger, less dense, spherical targets (microns in diameter) are used that contain gaseous Hydrogen isotopes. The SSCS-CI method provides a means by which one can produce much smaller targets that possess much higher density since the individual target cluster ions have roughly the same density as that of solid Hydrogen. These much smaller, and higher density (laminated) solid state targets should provide critical advantages. The size range (physical diameter) for these coated targets will extend from a few microns to targets of any kind significantly smaller than one micron. In the second case, the coated cluster ions are accelerated to very high energy in specifically designed accelerators. In this case they may used as projectiles for collisions with a wide variety of targets. This method also can subject them to the very high temperature and pressure conditions necessary for fusion. For example, one type of target for the coated projectile might be a wall of specific composition and structure such as solid (or liquid) Lithium (Li). Another type of target might be an ensemble of high energy neutral particles propagating with velocity vectors of opposite sign. Regardless of the mechanism by which the ions are heated and compressed to achieve fusion, the availability of these coated cluster ions will make possible a wide range of new experiments and developments in this field.

It is important to realize that the character of a solid-state cluster ion impact or ablative implosion is distinct and intrinsically different from the (well know) analogous processes that use nuclei and atomic ions.

The schematic illustration in FIG. 1 of the SSCS-CI process as applied to the specific example of Hydrogen will be utilized as follows. The conventional source 10 is used to generate isotopic Hydrogen cluster ions that are velocity selected by units 12a, b and are subsequently mass analyzed by quadrupole mass filter unit 14. The mass-selected beam of Hydrogen cluster ions is then bent by the magnetic field unit 16 and enters a drift tube unit 18 which contains an atomic neutral gas of element U wherein the growth cycle occurs. The reaction in the drift tube may be written,

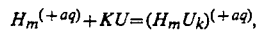

$$H_m^{(+aq)} + KU = (H_mU_k)^{(+aq)},$$

where the positively charged (+aq, with a multiples of charge %) Hydrogen cluster ion $H_m^{(+aq)}$ undergoes K additions of element U to produce the U-coated cluster ion $(H_mU_k)^{(+aq)}$. The emerging beam of U-coated isotopic Hydrogen cluster ions then enters a second quadrupole mass filter unit 20 to produce a beam of size, structure, and composition specific U-coated isotopic Hydrogen cluster ions that are stored in an ion trap unit 22.

A second application of this process is in the area of Advanced Propulsion. In this case, the coated hydrogen cluster ions could be used as fuel for fusion reactors that operate in outer space. Because the conditions in outer space (low densities and temperatures) are compatible with the use of ion traps, large trapping structures could be used to contain the cluster ion fuel. Likewise, the conditions in outer space are compatible with the use of linear or other accelerators. Large, light weight, linear accelerators could be used to bring about fusion of the cluster ions. The cluster ion fuel would be burned on board the space craft to provide either propulsion, i.e. by ejecting high speed products or heating a working fluid, or by generation of electrical power.

A third application is in the semiconductor field. Ion clusters of well known composition could be produced and used to implant (or dope) various substrates (such as silicon, germanium etc.) to produce new semiconductor materials with unique properties.

A fourth application might be the branch of Chemistry dealing with surface or gas phase catalyzed reactions. This would involve use of the process in some phase of the manufacture, storage, or basic research into specific clusters in terms of their properties as catalysts (size, reactivity etc.).

Continued research in the area of designing larger traps for large cluster ions would make possible the confinement of other types of large molecules for other fields of research, such as the synthesis and confinement of polymer or nucleic acid ions.

When the SSCS-CI process is applied to the problem of producing and storing precision coated targets (or projectiles) for fusion, numerous advantages emerge. The SSCS-CI method makes available a wide range of new and well defined sizes, structures, and compositions of solid state cluster ions for experimentation. Because virtually any type of laminar structure is possible, one has the ability to precisely control the radial variation in the index of refraction of these cluster ions and hence, their optical characteristics as well. At the same time the process provides the ability to also control the size, structure, composition, and density of cluster ions. Because the cluster ions are stored in the containerless environment of ion trapping structures, high precision cluster ions may be kept for long times and still preserve their chemical and structural identity. Ion traps provide dynamic storage of the trapped ions; this is also an advantage since the probability of accidental collisions with background gas is actually decreased as a result. Ion traps also require very little energy to operate and may be made compact or large as required and may be constructed of light weight materials.

Cluster ions are easy to control with the application of electric and magnetic fields, which makes them an ideal form for storage since the means of moving them to and from storage also becomes relatively easy.

Also, cluster ions of very large sizes could be produced with very narrow, well defined (narrow) size distributions. Large sizes are possible because multiply charged cluster ions may be utilized. For most dielectric materials the ratio of mass-to-charge-ratio of the cluster ions does not exceed $10^4$ AMU/electron charge. Because the mass-to-charge-ratio is limited, the size of cluster ions that can be produced and stored is essentially unlimited. In addition, one may collect, assemble, and store large ensembles of exotic matter (e.g. antimatter) in the form of cluster ions. Ion traps are currently used for the confinement of small quantities of ions for frequency standard research. The production of large volume ion traps or the coupling of many ion traps into arrays would enable storage on a large scale.

The invention may be described as a process whereby specially coated ion clusters are synthesized and stored within a containerless environment that is generated by generalized hybrid ion trap structures. The process of central importance is the generalized growth cycle. An example of one such growth cycle, utilizing ion-atom association is, $$A_m^{(\pm aq)} + kA = A_{m+k}^{(\pm aq)} \tag{1}$$

whereby an ion cluster of element A, consisting of m atoms and with net charge ($\pm aq$, with a $\geq 1$) may be transformed into the larger $A_{m+k}^{(\pm aq)}$ ion after having undergone the sequential addition of k atoms of element A. In likewise fashion, the analagous ion-molecule association growth cycle could have been performed, $$A_m^{(\pm aq)} + kA_n = A_{m+kn}^{(\pm aq)}, \tag{2}$$

to produce a product cluster $A_{m+kn}^{(+-aq)}$ of the same composition (but potentially different structure) via k additions of molecule $A_n$ molecules. These two examples illustrate how homogeneous cluster ions (composed of one element) are produced.

The previously discussed coated cluster ions are heterogeneous (composed of more than one element) and can be grown via the ion-atom association growth cycle, $$A_m^{(\pm aq)} + kP = (A_m P_k)^{(\pm aq)}, \tag{3}$$

whereby the cluster ion $A_m^{(\pm aq)}$ is coated with atoms of element P by performing k additions (growth cycles) to produce the P atom-coated cluster ion $(A_m P_k)^{(\pm aq)}$. Similarly, ion-molecule association could be performed with molecules (of size n, with $n \geq 2$).

$$A_m^{(\pm aq)} + kP_n = (A_m P_{kn})^{(\pm aq)}, \tag{4}$$

whereby k additions of $P_n$ molecules produces the $P_n$ molecule-coated cluster ion $(A_m P_{kn})^{(\pm aq)}$.

The previous two examples show how to produce binary, heterogeneous cluster ions. The preparation of multiple laminated cluster ions is done by performing sequential growth cycles with different elements (p, Q, etc.).

$$A_m^{(\pm aq)} + kP = (A_m P_k)^{(\pm aq)}, \tag{5}$$

$$(A_m P_k)^{(\pm aq)} + rQ = (A_m P_k Q_r)^{(\pm aq)}, \ldots \text{etc.}, \tag{6}$$

as before, the added laminar structures may result from the addition of atoms or molecules of elements P, Q, etc.

It should be noted that other possibilities exist for growth cycles. One such possibility is ion-ion association between oppositely charged ions. For example, $$A_n^{(\pm aq)} + P_m^{(-bq)} = B^{(\pm cq)} + F^{(\pm dq)}, \tag{7}$$

with the criteria that ($a \neq 0$ and $b \neq 0$), ($n \geq 1$), ($m \geq 1$), ($c \neq 0$), (P=A, or P$\neq$A), and (d=0 or d$\neq$0). In this example, the cluster ion $A_n^{(+aq)}$ collides with the oppositely charged atomic (m=1) or molecular (m>1) ion $P_m^{(-bq)}$ to produce charged (c$\neq$0) homogeneous (P=A) or heterogeneous (P$\neq$A) product cluster ions $B^{(\pm cq)}$. Additional charged (d$\neq$0) and uncharged (d=0) fragments F (consisting of elements A and P) are produced so as to maintain the mass and charge balance of equation 7.

The intent is to use this process in order to produce large quantities of size, structure, and composition specific cluster ions for a wide range of new applications and experiments. The successful development of the SSCS-CI concept will bring about a new technology centered around the manipulation of cluster ions. In particular, this technology will help bridge the gap between Atomic (and Molecular) Physics and Chemistry, enabling scientists to prepare and store a well defined gas of cluster ions having an enormously wide range of specific properties (mass, charge, structure, composition, density, reactivity, etc.).

As mentioned previously, the application of the concept is not limited to the use of hydrogen clusters and it also incorporates flexibility in the selection of reactions (e.g. ion-atom, ion-molecule, ion-ion, etc.). Flexibilities also exist in the design of the hybrid ion traps such as, 1. New geometries (1, 2, and 3 dimensional arrays).

2. Hybrid ion trap structures (that use alternating as well as static).
2. Large volume ion trap structures.
3. New electrode configurations and shapes.
4. Computer interfacing.
5. New electric and magnetic field geometries.

Although the invention has been described with reference to a particular embodiment, it will be understood to those skilled in the art that the invention is capable of a variety of alternative embodiments within the spirit and scope of the appended claims.

What is claimed is:

1. A method of producing coated cluster ions which comprise:
   a) generating cluster ions of a selected element,
   b) selecting only cluster ions having a first predetermined velocity,
   c) sorting said cluster ions according to a predetermined mass,
   d) selecting said cluster ions according to a second predetermined velocity,
   e) passing the beam of said cluster ions through a magnetic field to change its direction,
   f) passing the beam of said cluster ions through a drift tube which contains a gaseous neutral vapor,
   g) growing a coat of said vapor on said cluster ions to produce coated cluster ions,
   h) passing said coated cluster ions through a quadrupole mass filter to mass select said coated cluster ions and to produce a beam of size, structure and composition specific coated cluster ions, and
   i) trapping said coated cluster ions in an ion trap.

2. A method of producing coated cluster ions as described in claim 1 wherein said first and second predetermined velocities are equal.

3. A method of producing coated cluster ions as described in claim 1 wherein said coated cluster ions are isotopic.

4. A method of producing coated cluster ions as described in claim 1 wherein said selected element is Hydrogen.

5. A method of producing coated cluster ions as described in claim 1 wherein said coated cluster ions are heterogeneous.

6. A method of producing coated cluster ions as described in claim 1 wherein said coated cluster ions are homogeneous.

7. A method of producing coated cluster ions as described in claim 1 further including repetitive growing steps with different elements to produce multiple laminated cluster ions.

8. A method of producing coated cluster ions as described in claim 1 wherein said growing step consists of one from the following group:
   1. gas phase ion-atom,
   2. ion-molecule, and
   3. ion-ion association reactions.

* * * * *